United States Patent [19]

Fujimaki et al.

[11] 4,296,954
[45] Oct. 27, 1981

[54] PIPE COUPLING AND PIPE JOINT CONNECTION

[75] Inventors: Kiyoshi Fujimaki, Kusatsu; Yoshiaki Bando, Shiga; Takesi Okuyama, Kyoto; Tutomu Hashimoto, Shiga, all of Japan

[73] Assignee: Sekisui Kagaku Kogyo Kabushiki Kaisha, Osaka, Japan

[21] Appl. No.: 74,806

[22] Filed: Sep. 11, 1979

[30] Foreign Application Priority Data

Sep. 14, 1978 [JP] Japan ............... 53-126827[U]
Dec. 4, 1978 [JP] Japan ............... 53-167386[U]

[51] Int. Cl.³ .................................. F16L 17/06
[52] U.S. Cl. ................... 285/331; 285/350; 285/355; 285/369; 285/379; 285/383
[58] Field of Search ............ 285/350, 355, 331, 390, 285/349, 383, 369, 287, 294, 297, 40, 379

[56] References Cited

U.S. PATENT DOCUMENTS

| | | | |
|---|---|---|---|
| 1,368,196 | 2/1921 | Peck | 285/349 |
| 1,682,635 | 8/1928 | Smith | 285/383 X |
| 1,909,478 | 5/1933 | Wilson | 285/379 X |
| 2,915,322 | 12/1959 | Dunlop | 285/355 |
| 3,100,656 | 8/1963 | MacArthur | 285/350 X |
| 3,472,533 | 10/1969 | Turner | 285/355 X |
| 4,002,359 | 1/1977 | Lari | 285/331 |

FOREIGN PATENT DOCUMENTS

| | | | |
|---|---|---|---|
| 427434 | of 1911 | France | 285/369 |
| 38251 | 1/1931 | France | 285/349 |
| 37-18144 | 7/1962 | Japan . | |

Primary Examiner—Dave W. Arola
Attorney, Agent, or Firm—Wenderoth, Lind & Ponack

[57] ABSTRACT

A pipe coupling has a main body including (a) a threaded portion adapted for threaded engagement with an inside-coated pipe having a mating threaded end portion, (b) an annular groove and (c) an annular projection, the members (a), (b) and (c) being located on the inside circumferential surface of the main body in this recited order from each open end of the main body toward the central portion thereof, a short cylindrical body having one end abutting the annular projection and being mounted within the main body, and an annular packing mounted within the space defined by the threaded portion (a), said annular groove and the peripheral surface of the cylindrical body. A pipe joint connection is provided by threadedly engaging inside-coated pipes with the threaded portions of the coupling. The pipe coupling of the invention permits a leakage-free pipe joint connection on the job by simply threading inner-coated steel pipes and threadedly connecting these pipes through the coupling.

4 Claims, 9 Drawing Figures

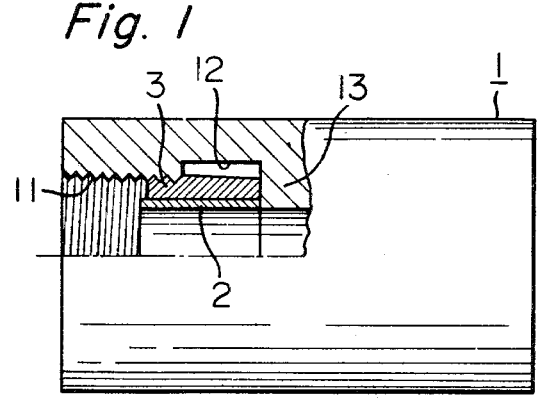
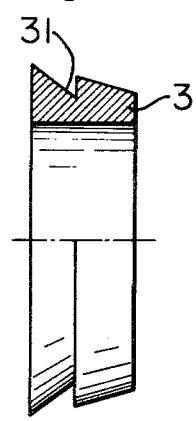
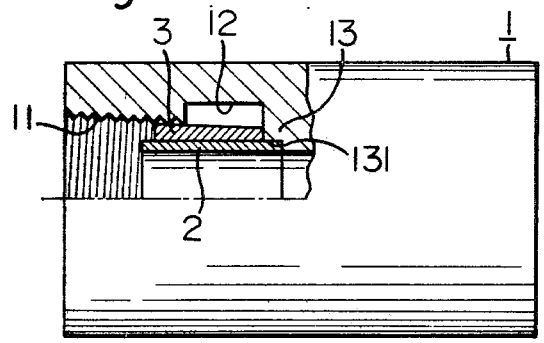
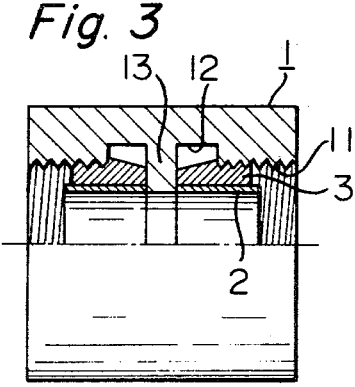
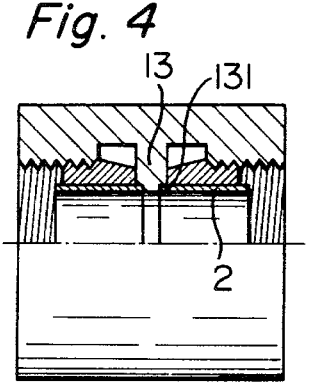

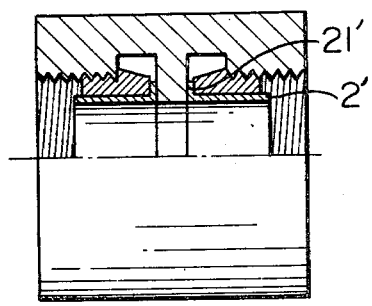
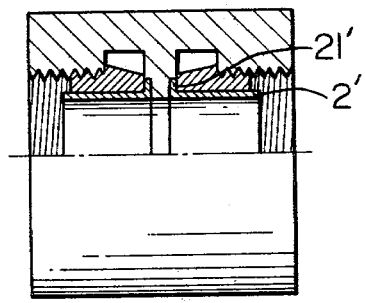
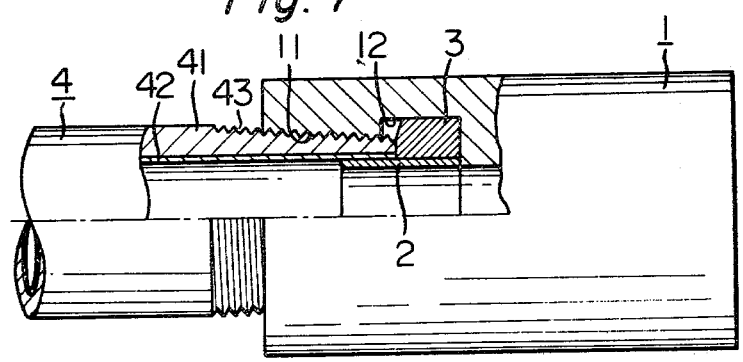
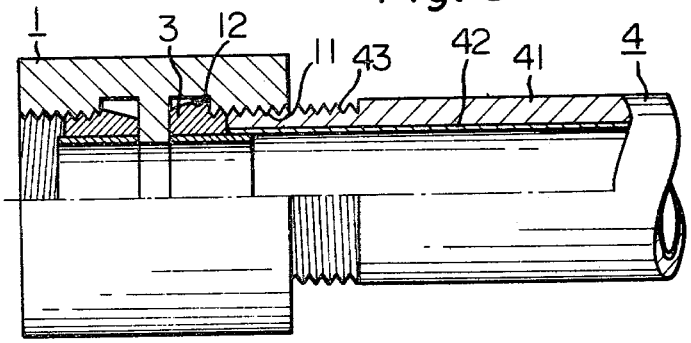

PIPE COUPLING AND PIPE JOINT CONNECTION

This invention relates to a pipe coupling for connecting inside-coated steel pipes, and to a pipe joint connection resulting from the threaded engagement of these pipes with the coupling.

A known pipe coupling for connecting inside-coated steel pipes comprises an inner cylindrical body made of ceramic or porcelain and mating closures of iron holding said inner cylindrical body therebetween to form a unitary structure, said coupling having a threaded portion at each open end adapted for pipe connection (see Japanese Utility Model Publication No. 18144/62). In threaded engagement of pipes with the coupling, a packing is inserted in the inner cylindrical body of the pipe coupling toward each open end. When the pipes are clamped with the coupling, the packing is compressed between the inner cylinder and these pipes. Accordingly, the packing is forced to bulge into the inner cylindrical body or the pipes at the joint portion. In some case, mere clamping results in dropping of the packing, and even when this is not the case, the packing may drop off when a fluid or the like is passed through the pipe. In other words, this conventional structure has the defect that to prevent such dropping of the packing, the pipes cannot be clamped fully with the pipe coupling, and as a result, leakage of a fluid from the joint portion or corrosion of the end surfaces of the connected pipes cannot be fully prevented.

Another conventional pipe coupling for connecting inside-coated steel pipes is disclosed in U.S. Pat. No. 2,915,322 which has a structure adapted for fitting of a packing in an annular space defined by a depression at the central portion of the couping which corresponds to a pipe joint portion and a recess formed at the end portion of a pipe which corresponds to the pipe joint portion. When such a pipe coupling is used, machining must be performed on the job so as to provide a recess at the end portion of pipes, thus requiring an extra operation.

It is an object of this invention to provide a pipe coupling which does not permit leakage at the pipe joint portion.

Another object of this invention is to provide a pipe coupling which permits connection of pipes by simply threading the pipes on the job and threadedly engaging them with the coupling.

Other objects and advantages of this invention will become apparent from the following description taken in conjunction with the accompanying drawings.

According to this invention, these objects and advantages can be achieved by a pipe coupling comprising a main body including (a) a threaded portion adapted for threaded engagement with an inside-coated pipe having a mating threaded end portion, (b) an annular groove and (c) an annular projection, said members (a), (b) and (c) being located on the inside circumferential surface of said main body in the recited order from each open end of the main body toward the central portion thereof, a short cylindrical body having one end abutting said annular projection and being mounted within said main body, and an annular packing mounted within the space defined by said threaded portion (a), said annular groove and the peripheral surface of said cylindrical body.

IN THE DRAWINGS

FIG. 1 is an elevational, partly sectional, view showing one embodiment of the pipe coupling of this invention;

FIGS. 2 to 6 are elevational, partly sectional, views showing other embodiments of the pipe coupling of this invention;

FIG. 3a is an elevational, partly sectional, view of an annular packing which constitutes part of the pipe coupling of this invention;

FIG. 7 is an elevational, partly sectional, view of one embodiment of the pipe joint connection of this invention; and FIG. 8 is an elevational, partly sectional, view of another embodiment of the pipe joint connection of this invention.

Referring to FIGS. 1 and 3, a tapered threaded portion 11 is provided on the inside circumferential surface of the end portion of a main body 1 of the pipe coupling. An annular groove 12 is provided on the same inside circumferential surface at a position farther toward the center of the main body 1 from the threaded portion 11. Furthermore, an annular projection 13 is formed at a position farther toward the center of the main body 1. Preferably, the surfaces of the annular groove 12 and the annular projection 13 are coated with an anticorrosive material. Within the main body 1 of the pipe coupling is mounted a short cylindrical body 2 in abutment with the annular projection 13. The short cylindrical body 2 is made of a material which does not easily deform upon the application of an external force and is corrosion-resistant, such as stainless steel. Preferably, its inside diameter is nearly equal to the inside diameter of the main body 1 of the pipe coupling at the projection 13, and it length is greater than the width of the annular groove 12. An annular packing 3 is fitted within a space defined by the side wall of the projection 13, the annular groove 12 and a part of the threaded portion 11, and a space remains in a part of the annular groove 12. The packing 3 is made of an elastic material such as rubber, plastic, etc. The width of the circumferential surface of the packing 3 is preferably greater than that of the annular groove 12 and smaller than that of the circumferential surface of the short cylindrical body 2. The thickness of the packing 3 is progressively greater from the end thereof on the side of the projection 13 toward the other end of the side of the tapered threaded portion 11. At the portion between the short cylindrical body 2 and the tapered threaded portion 11, the thickness of the packing 3 is slightly greater than the distance between the short cylindrical body 2 and the tapered threaded portion 11, and therefore, the annular packing 3 preferably presses against the tapered threaded portion 11.

The annular packing 3 in FIG. 3 has an engaging portion to be engaged with the side wall of the annular groove 12 toward the open end of the main body 1, and is therefore engaged with the annular groove 12 through the engaging portion. FIG. 3a shows one example of the annular packing 3 having a recess 31 formed in its circumferential surface.

The pipe coupling of this invention can be produced by mounting the annular packing 3 on the short cylindrical body 2, and inserting the short cylindrical body 2 into the main body 1 until the short cylindrical body 2 abuts the projection 13.

Preferably, the annular packing 3 is caused to press the tapered threaded portion 11 of the main body 1 because the short cylindrical body 2 is fixed to the annular projection of the main body while the short cylindrical body 2, the annular packing 3 and the projection 13 are disposed concentrically.

As shown in FIGS. 2 and 4, it is possible to have the short cylindrical body 2 abut the projection 13 by providing a recess 131 on the inside circumferential surface of the projection 13 and fitting the short cylindrical body 2 into the recess 131. Such a structure is desirable since the short cylindrical body 2 is firmly and accurately fixed to a predetermined position of the projection 13. When this recess is tapered toward the center of the main body 1, the short cylindrical body 2 can be firmly and accurately fixed. When one end of the short cylindrical body 2 is caused to abut the recess 131 of the projection 13, the short cylindrical body 2 can be firmly and accurately fixed to the projection 13 in spite of the fact that the annular packing 3 presses the tapered threaded portion 11.

FIG. 5 shows another embodiment of the pipe coupling of this invention which includes a short cylindrical body 2' having a collar 21' adapted for abutment with the projection 13.

FIG. 6 shows still another embodiment of the pipe coupling of this invention in which the inside circumferential surface of the side wall of the projection 13 has a recess adapted for receiving of the collar 21' of the short cylindrical body 2', and the short cylindrical body 2' is caused to abut the projection 13 by fitting the collar 21' into the recess.

The pipe coupling of this invention described above is used to connect inside-coated steel pipes simply and exactly.

FIGS. 7 and 8 each show a pipe joint connection comprising the pipe coupling and inside-coated pipes having a mating threaded end portion threadedly engaged with the threaded portion of the pipe coupling.

The reference numeral 4 represents inside-coated steel pipes to be connected by the coupling. The inside surface of a steel pipe 41 is provided with a corrosion-resistant coated layer 42 of plastic, glass, etc. A tapered mating threaded portion 43 is provided on the peripheral surface of the end portion of the pipe. When the mating threaded portion 43 of the inside-coated steel pipe 4 is threadedly engaged with the tapered threaded portion 11 of the pipe coupling and they are threaded together, the end surface of the inside-coated pipe 4 soon abuts the annular packing 3. On further threading the annular packing 3 deforms within the annular groove 12, escaping from between the sleeve 2 and coupling 1, and is effectively compressed by the peripheral surface of the short cylindrical body 2, the inside wall of the projection 13, the end surface of the inside-coated pipe 4 and the inside circumferential surface of the annular groove 12. As a result, the annular packing 3 effectively seals the mated portion of the threads 11 and 43 on that side which faces the center of the pipe coupling.

Thus, when inside-coated steel pipes are connected by means of the coupling of this invention, the annular packing 3 deforms within the annular groove 12 without being displaced inwardly by the pushing force of the end surface of the inside-coated steel pipe. As a result, the repulsive force of the annular packing 3 provides a complete sealing of the end surface of the inside-coated steel pipe and the mated portion of the thread 11 of the coupling and the thread 43 of the pipe, thus preventing corrosion of these portions and leakage of liquids from the pipe joint portion.

What is claimed is:

1. A pipe coupling comprising:
   a main annular body having a central axis and an internally threaded portion at the open end thereof for threaded engagement with an inside-coated pipe having an exterior mating threaded end portion, an internal annular groove at the inner end of said internally threaded portion, and an annular projection at the inner side of said annular groove and projecting toward said axis of said annular body;
   a short cylindrical body mounted within said main body having an outer cylindrical surface and having one end abutting said annular projection; and
   an annular packing mounted within the space defined by said internally threaded portion, said annular groove and the outer cylindrical surface of said cylindrical body, the dimension of the circumferential surface of the annular packing parallel to said axis of said annular body and when said packing is in the uncompressed state being greater than the corresponding dimension of the circumferential surface of the annular groove and less than the corresponding dimension of the cylindrical outer surface of said short cylindrical body, and the end of the annular packing toward the open end of the main body being pressed into the internally threaded portion for being provisionally fixed in position in said pipe coupling.

2. A coupling as claimed in claim 1 wherein said projection has an annular recess in the inner portion thereof in which said cylindrical body is seated.

3. A coupling as claimed in claim 1 or 2 wherein said annular packing has an annular engaging portion on the peripheral surface thereof fitting into said groove and engaging with the side wall of the groove which is toward the open end of said main body.

4. A coupling as claimed in claim 1 or 2 wherein said annular packing has an annular engaging portion on the peripheral surface thereof for fitting into said groove which is toward the open end of said main body, said packing having an annular recess therein separating said annular engaging portion from the remainder of said packing.

* * * * *